US008256374B2

(12) United States Patent
Burkley et al.

(10) Patent No.: US 8,256,374 B2
(45) Date of Patent: Sep. 4, 2012

(54) APPARATUS AND METHODS FOR PROFILE WRAPPING LAMINATES

(75) Inventors: Brian Burkley, Duluth, GA (US); Dave Deibel, Cumming, GA (US); Dennis Dodge, Peachtree City, GA (US); Scott Walker, Roswell, GA (US)

(73) Assignee: Nordson Corporation, Westlake, OH (US)

( * ) Notice: Subject to any disclaimer, the term of this patent is extended or adjusted under 35 U.S.C. 154(b) by 1219 days.

(21) Appl. No.: 12/042,120

(22) Filed: Mar. 4, 2008

(65) Prior Publication Data

US 2008/0251189 A1 Oct. 16, 2008

Related U.S. Application Data

(60) Provisional application No. 60/911,187, filed on Apr. 11, 2007.

(51) Int. Cl.
*B05C 3/02* (2006.01)
*B05C 5/00* (2006.01)
*B05C 11/00* (2006.01)
*B05B 1/00* (2006.01)
*B32B 37/12* (2006.01)

(52) U.S. Cl. ........ 118/410; 118/300; 118/304; 118/712; 239/597; 156/228; 156/578

(58) Field of Classification Search .................. 118/410, 118/411, 413, 106, 257, 206, 300, 304, 325, 118/419, 712, 500; 427/277, 278, 359, 369; 156/228, 378, 578, 558, 159, 544, 582, 166, 156/216; 239/597
See application file for complete search history.

(56) References Cited

U.S. PATENT DOCUMENTS

| | | | | |
|---|---|---|---|---|
| 3,919,974 | A * | 11/1975 | Herzog | 118/410 |
| 4,943,451 | A * | 7/1990 | Zimmer | 427/294 |
| 5,234,519 | A | 8/1993 | Talbot et al. | |
| 5,766,356 | A * | 6/1998 | Kurimoto | 118/410 |
| 5,862,993 | A | 1/1999 | Bagung | |
| 5,992,488 | A | 11/1999 | Bortolini | |
| 6,110,282 | A * | 8/2000 | Tateyama et al. | 118/712 |
| 6,180,172 | B1 | 1/2001 | Hasenkamp et al. | |

OTHER PUBLICATIONS

European Patent Office, European Search Report in EP Application No. 08153776, Aug. 18, 2008.
Nordson Coporation, PW Series Profile Wrapping Application Head dated 2000.
Nordson Corporation, TrueCoat Slot Applicators dated 2006.
Nordson Corporation, DPW Series Profile Wrapping Application Head dated 2005.
European Woodworking Machinery Co., Profile Wrapping Machine dated Mar. 28, 2007.

* cited by examiner

*Primary Examiner* — Yewebdar Tadesse
(74) *Attorney, Agent, or Firm* — Wood, Herron & Evans, LLP

(57) ABSTRACT

Apparatus and methods for applying a coating of adhesive to laminate cover material in a profile wrapping operation. The apparatus can include a slot nozzle, a pressure roller, and a drive roller. The drive roller and pressure roller are movable to first positions in which the drive roller and pressure roller are spaced from the laminate, and second positions in which the drive roller and pressure roller contact the laminate to feed the veneer over the slot nozzle. The apparatus may be used to apply adhesive to raw veneer provided in strip form and to laminates provided in roll form.

8 Claims, 4 Drawing Sheets

APPARATUS AND METHODS FOR PROFILE WRAPPING LAMINATES

CROSS REFERENCE TO RELATED APPLICATIONS

The present application claims priority to U.S. Provisional Patent Application Ser. No. 60/911,187 filed Apr. 11, 2007, the disclosure of which is incorporated by reference herein in its entirety.

TECHNICAL FIELD

The present invention relates generally to apparatus and methods for dispensing liquid materials, and more particularly to apparatus and methods for dispensing adhesive to laminate cover materials during profile wrapping of substrates.

BACKGROUND

Profile wrapping involves joining laminate cover materials to substrates such as particle board, lumber core, fiberboard, or other materials, to provide a decorative or aesthetically pleasing appearance to furniture or other structures. Exemplary laminate cover materials include films of vinyl, paper, foil, or other materials; thin veneers of wood; or other laminate materials. The laminate cover material may be provided in roll form and applied to a substrate in a substantially continuous process until the entire roll is depleted. In other applications, raw veneer may be provided in discrete length strips. In either form, adhesive must be applied to the laminate, the substrate, or both, so that the laminate can be securely joined to the substrate.

One conventional method of applying adhesive to laminates in either roll or strip form involves the use of an applicator wheel and a well, or pot, of adhesive. A portion of the applicator wheel extends into the pot such that the outer circumference of the wheel becomes covered with adhesive as the applicator wheel rotates through the pot. The laminate cover material is passed over the rotating wheel such that adhesive carried on the outer circumference of the wheel is transferred to the laminate prior to joining the laminate to the substrate.

Other manufacturing methods have utilized slot nozzles in continuous profile wrapping applications to apply a controlled coating of adhesive to laminate cover materials dispensed from a roll. The laminate is unwound from the roll and pulled over the slot nozzle where a coating of adhesive is dispensed to the laminate prior to the laminate being directed to contact a substrate moving beneath the applicator.

SUMMARY

The present invention overcomes the foregoing and other shortcomings and drawbacks of apparatus and methods heretofore known for dispensing adhesive to laminate cover materials during profile wrapping of substrates. While the invention will be described in connection with certain embodiments, it will be understood that the invention is not limited to these embodiments. On the contrary, the invention includes all alternatives, modifications and equivalents as may be included within the spirit and scope of the present invention.

In one aspect, an apparatus for applying adhesive to a veneer strip includes a slot nozzle having a liquid outlet for dispensing liquid material and a pressure applying element adjacent the slot nozzle. The slot nozzle may be adjustable to vary a width of the liquid outlet or a position of the liquid outlet. Veneer strip may be received between the slot nozzle and the pressure applying element so that the pressure applying element presses the veneer strip against the slot nozzle. The pressure applying element may also be movable from a first position spaced from the roller to allow a veneer strip to be freely received therebetween, and a second position wherein the pressure applying element presses the veneer strip against the slot nozzle.

In one embodiment, the pressure applying element is a pressure roller, although various other structures suitable for pressing veneer strip against the slot nozzle may alternatively be used. The pressure roller may be powered for rotation so that the pressure roller moves the veneer strip over the slot nozzle and subsequently directs the coated veneer strip to a substrate.

In another aspect, the apparatus further includes a drive roller that is powered for rotation to feed a veneer strip past the slot nozzle at a speed related to the speed of a substrate to which the coated veneer strip will be joined. The apparatus may further include an idler roller cooperating with the drive roller to feed the veneer strip past the slot nozzle. The drive roller may be movable from a first position spaced from the idler roller so that the drive roller will not contact veneer strip disposed between the drive roller and idler roller, and a second position wherein the drive roller will engage the veneer strip.

In another aspect in accordance with the principles of the disclosure, a method of applying adhesive to a strip of veneer includes moving the veneer strip over a slot nozzle applicator, pressing the veneer strip against the slot nozzle applicator, and starting the flow of adhesive through the slot nozzle applicator to dispense adhesive to the veneer strip as it moves over the slot nozzle applicator.

DETAILED DESCRIPTION

Figure 1:
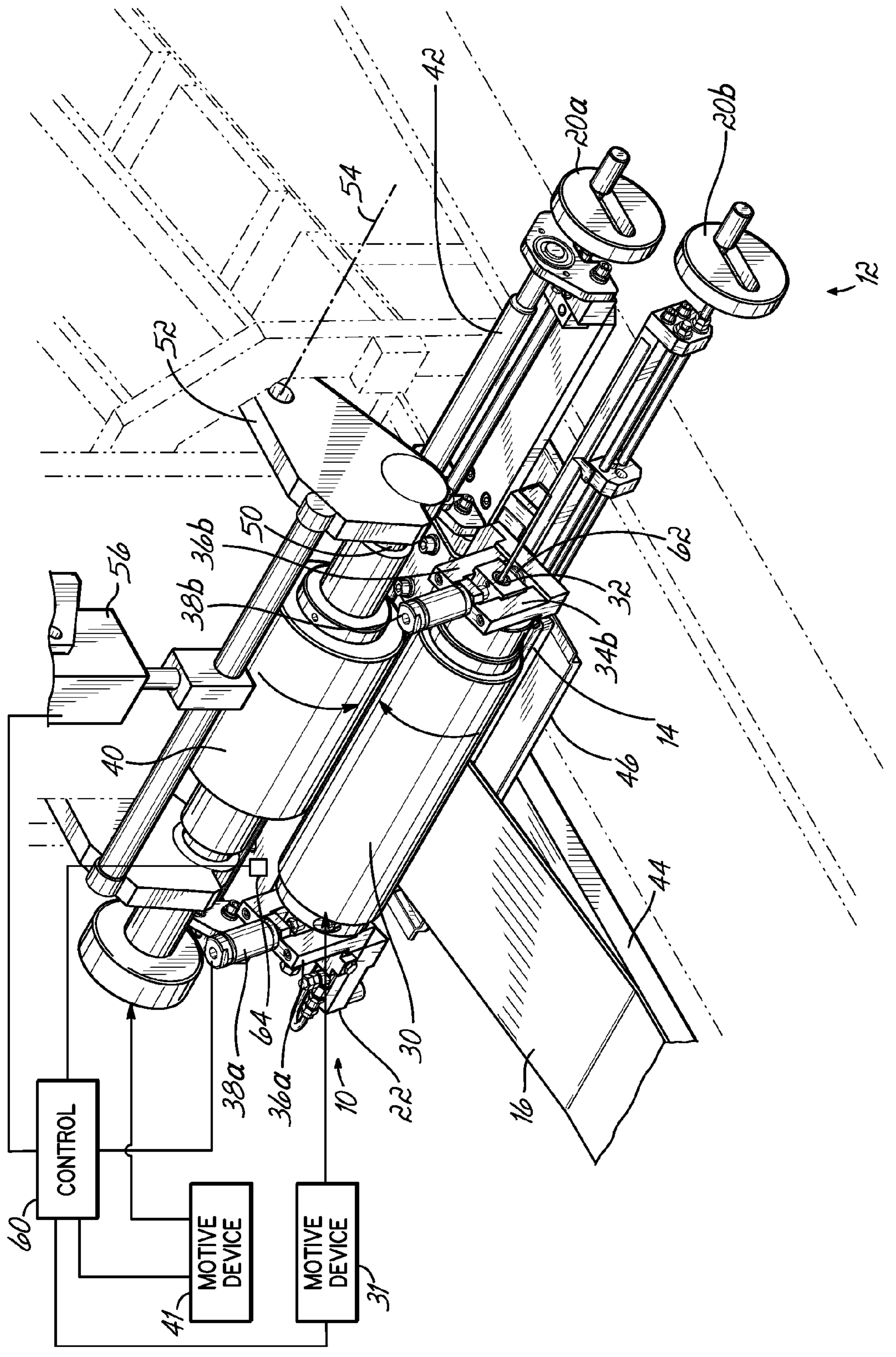
FIG. 1 is a perspective view depicting an exemplary apparatus for applying adhesive to veneer strip in a profile wrapping application.
Figure 2:
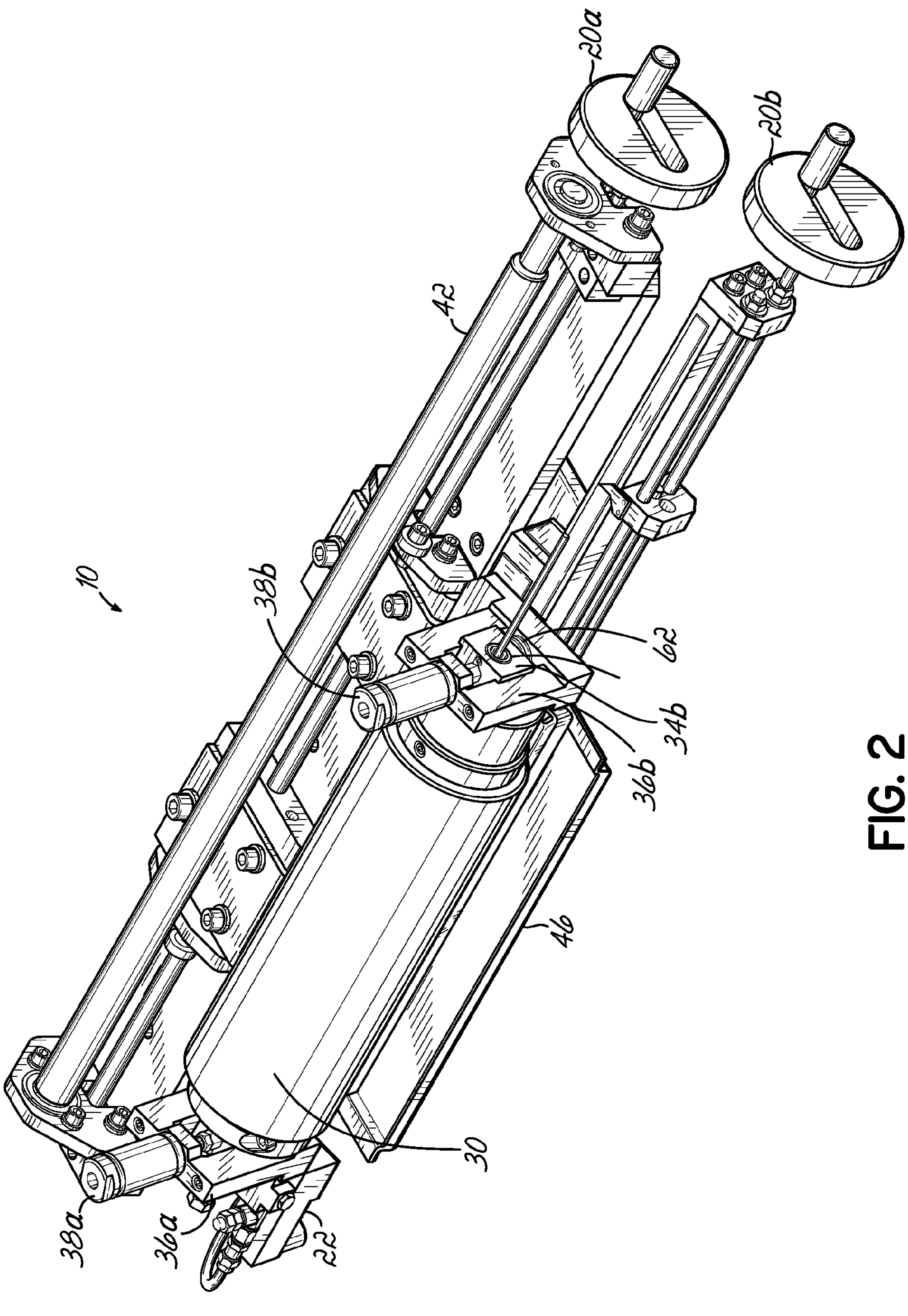
FIG. 2 is a partial perspective view of the apparatus of FIG. 1.
Figure 3:
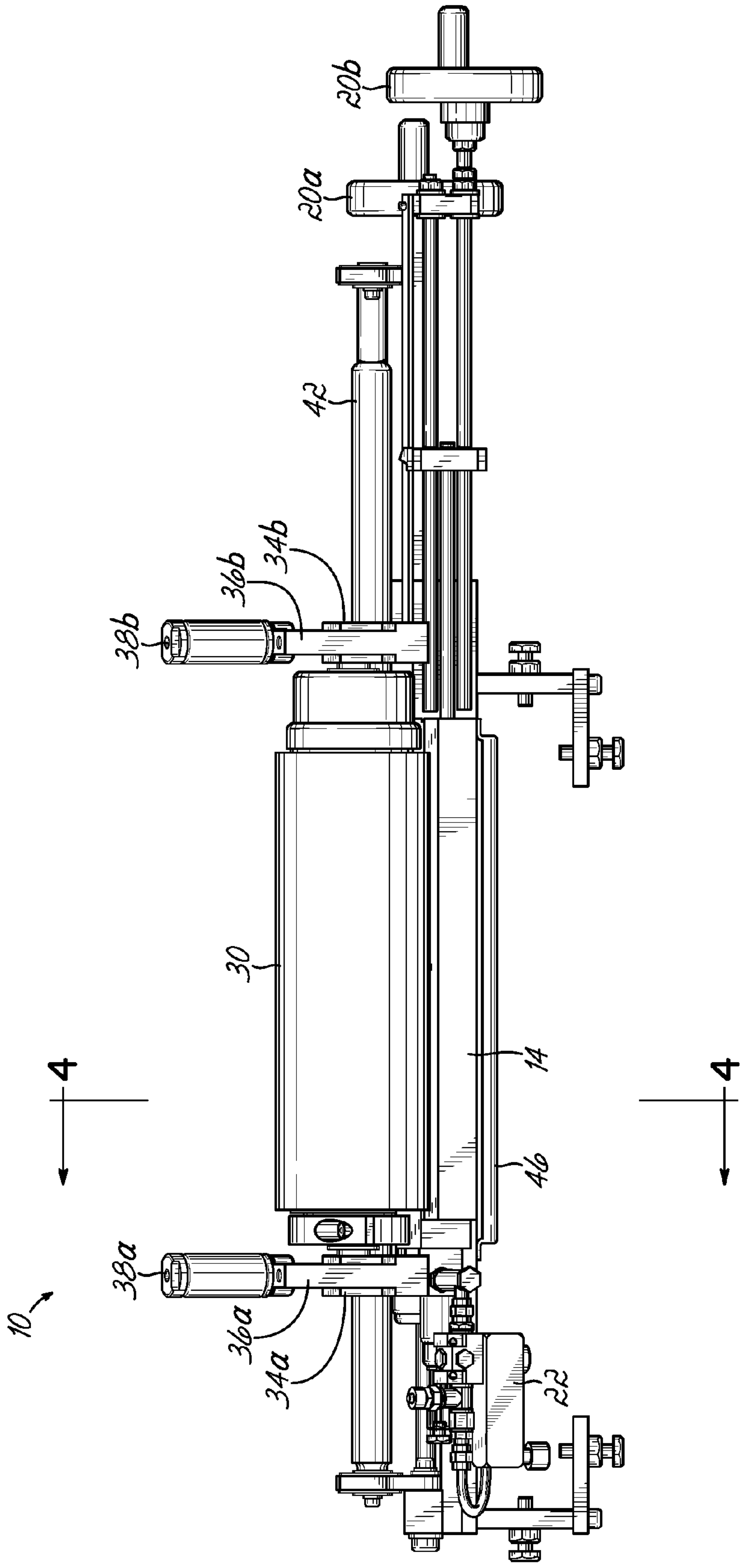
FIG. 3 is a front view of the apparatus shown in FIG. 2.
Figure 4:
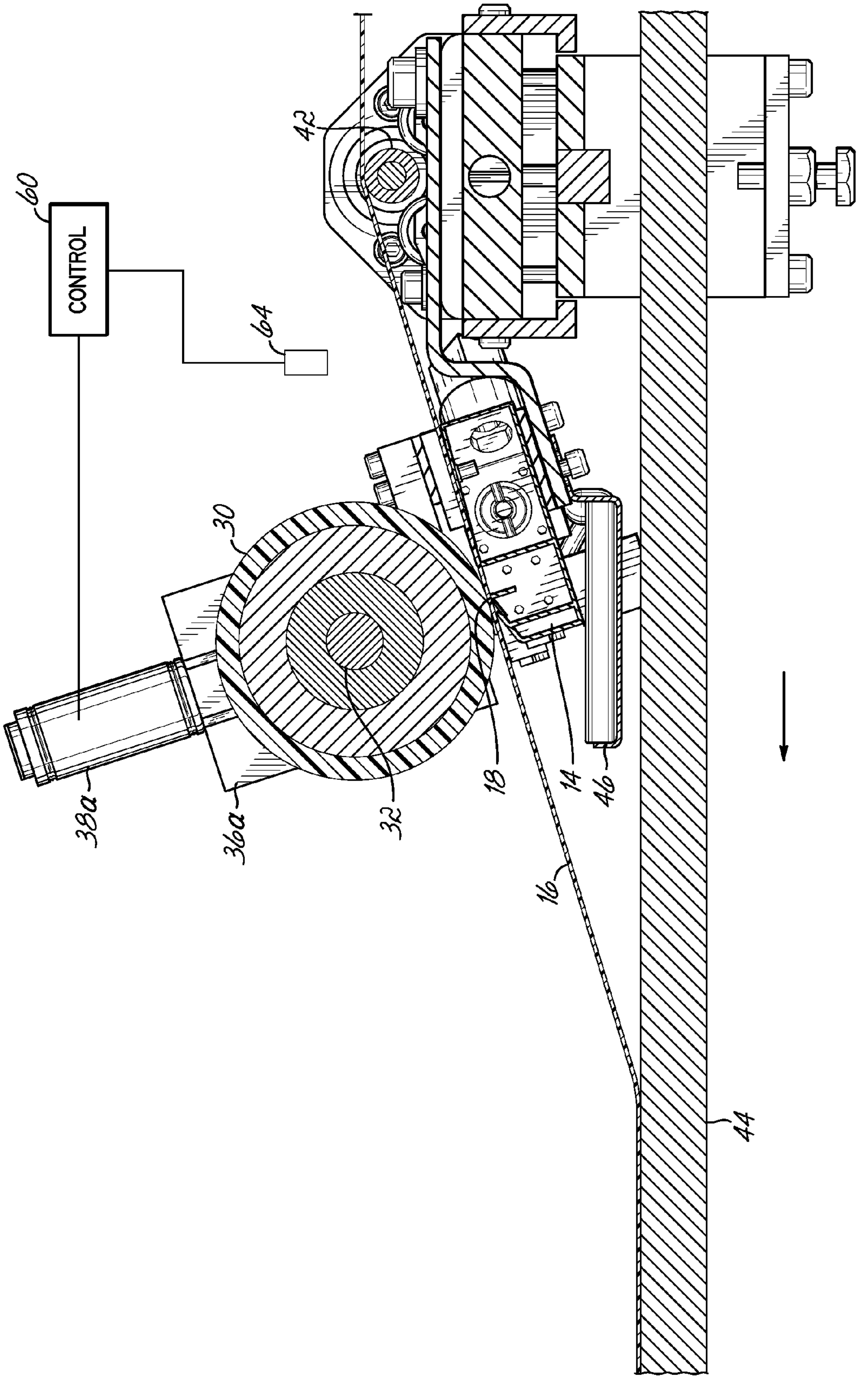
FIG. 4 is a partial cross-sectional view of the apparatus of FIG. 1.

FIGS. 1-4 depict an exemplary adhesive dispensing apparatus 10 for use with profile wrapping equipment 12 to apply adhesive to veneer strip and laminates provided in roll form. The apparatus 10 includes a slot nozzle applicator 14 for dispensing a coating of liquid material, such as adhesive, to one side of the laminate as the laminate is moved past the slot nozzle 14. In the embodiment shown, the laminate is a veneer strip 16 having a discreet length, but it will be appreciated that the apparatus 10 may also be used to apply adhesive to laminates fed from a roll in a continuous profile wrapping process.

In the embodiment shown, the slot nozzle 14 is a PW Series slot nozzle applicator available from Nordson Corporation of Westlake, Ohio. The slot nozzle 14 may be adjustable to vary the width and relative position of a liquid outlet 18 of the slot nozzle (see FIG. 4) as discussed, for example, in U.S. Pat. No. 5,862,993, assigned to the assignee of the present application, the disclosure of which is incorporated by reference herein in its entirety. In the embodiment shown, wheels, or knobs 20*a*, 20*b*, are provided to permit manual adjustment of the width and/or position of the liquid outlet 18. Liquid material is provided from a source (not shown) to the slot nozzle 14 and is dispensed from the liquid outlet 18 to coat substantially the entire surface of one side of the veneer strip 16. The slot nozzle 14 includes a pneumatic valve 22 that may be selectively actuated to start and stop the flow of adhesive from the liquid outlet 18, as described in U.S. Pat. No. 5,862,993.

The apparatus 10 further includes a pressure roller 30 adjacent the slot nozzle 14 and adapted to press the veneer strip 16 against the slot nozzle 14 as it moves past the slot nozzle 14. In the embodiment shown, the pressure roller 30 is mounted for movement toward and away from the liquid outlet 18 of the slot nozzle 14. Accordingly, the pressure roller 30 may be placed in a first position where the pressure roller 30 is sufficiently spaced from the slot nozzle 14 such that the veneer strip 16 may freely pass between the pressure roller 30 and the slot nozzle 14, and a second position wherein the pressure roller 30 engages the veneer strip 16 and presses the veneer strip 16 against the slot nozzle 14 to receive a coating of adhesive as the veneer strip 16 moves past the slot nozzle 14.

While pressure roller 30 has been shown and described herein for pressing veneer strip 16 against the slot nozzle 14, it will be appreciated that various other mechanisms suitable for pressing veneer strip 16 against slot nozzle 14 may alternatively be used. Other such suitable mechanisms need not include rolling elements, and therefore may be static structures. Other suitable mechanisms may also be provided with friction reducing features, such as low friction surfaces, to facilitate movement of veneer strip 16 past slot nozzle 14 as the mechanism presses veneer strip 16 against the slot nozzle 14.

In the embodiment shown, the pressure roller 30 is mounted on a shaft 32 having respective ends received in journal bearings 34*a*, 34*b*. The journal bearings 34*a*, 34*b* are slidably mounted within respective frames 36*a*, 36*b* for movement toward and away from the slot nozzle 14 so that the pressure roller 30 may be moved between the first and second positions. Pneumatic cylinders 38*a*, 38*b* operatively coupled to the journal bearings 34*a*, 34*b* may be actuated to selectively move the pressure roller 30 to the first and second positions. While sliding journal bearings 34*a*, 34*b* and pneumatic cylinders 38*a*, 38*b* are described herein for moving the pressure roller 30 between the first and second positions, it will be appreciated that various other mechanisms suitable for moving the pressure roller 30 between the first and second positions may alternatively be used.

The veneer strip 16 may be directed between the pressure roller 30 and the slot nozzle 14 by a drive roller 40 that is powered for rotation, directly or indirectly, by a motive device 41 (see FIG. 1). The drive roller 40 may be a component of the profile wrapping equipment 12 with which the adhesive dispensing apparatus 10 is used, or, as another possibility, it may be a more integral part of the adhesive dispensing apparatus 10. The drive roller 40 cooperates with an idler roller 42 to clamp the veneer strip 16 and to move the veneer strip 16 between the pressure roller 30 and the slot nozzle 14. After the veneer strip 16 passes over the slot nozzle 14 and receives a coating of adhesive, the veneer strip 16 is directed into contact with a substrate 44, such as particle board, core lumber, or other material, which is moving in a machine direction past the dispensing apparatus 10. The substrate 44 is driven for movement by separate driving mechanisms (not shown) of the profile wrapping equipment 12. Accordingly, the speed of the drive roller 40 is controlled to correspond to the speed of moving substrate 44 such that the veneer strip 16 can be joined to the substrate 44 after being coated with adhesive by the slot nozzle 14.

The pressure roller 30 may also be driven for rotational movement by a motive device 31 to facilitate feeding the veneer strip 16 over the slot nozzle 14 and to direct the adhesive-coated veneer strip 16 into contact with the substrate 44. When the pressure roller 30 is driven for rotational movement, it may not be necessary to use a drive roller 40 to move veneer strip 16 over the slot nozzle 14. Accordingly, the apparatus 10 may or may not include a drive roller 40 as described above. The apparatus 10 may further include a drip pan 46 positioned beneath the slot nozzle 14, to receive and contain any adhesive that might drip from the slot nozzle 14 or the veneer strip 16.

In the embodiment shown, the drive roller 40 is mounted on a shaft 50 that is in turn mounted to a yoke 52. The yoke 52 is pivotally movable about an axis 54 parallel to the shaft 50 of the drive roller 40 such that the drive roller 40 can be moved toward and away from the idler roller 42. A pneumatic cylinder 56 coupled to the frame structure of the profile wrapping equipment 12 is operatively connected to the pivoting yoke 52 to move the drive roller 40 from a first position where the drive roller 40 is sufficiently spaced from the idler roller 42 such that the drive roller 40 will not contact a veneer strip 16 disposed between the drive roller 40 and the idler roller 42, and a second position wherein the drive roller 40 engages a veneer strip 16 disposed between the drive roller 40 and the idler roller 42 such that rotation of the drive roller 40 causes the veneer strip 16 to be fed past the slot nozzle 14 and directed to the substrate 44.

The apparatus 10 may further include a control 60 for coordinating operation of the slot nozzle 14, drive roller 40, and pressure roller 30 to apply adhesive to veneer strip 16 during profile wrapping of a substrate 44. The control 60 communicates with the slot nozzle 14 and the pneumatic cylinders 38*a*, 38*b*, 56 and motive devices 31, 41 of the pressure roller 30 and the drive roller 40, and sends signals to the slot nozzle 14, pneumatic cylinders 38*a*, 38*b*, 56, and motive devices to cause an in-fed strip 16 of veneer to be moved over the slot nozzle 14 to receive a coating of adhesive.

In use, a veneer strip 16 is placed between the drive roller 40 and the idler roller 42 when the drive roller 40 is in the first position. When the leading edge of the veneer strip 16 is located adjacent the slot nozzle 14 and the speed of the drive roller 40 corresponds to the speed of a substrate 44 moving beneath the dispensing apparatus 10, the drive roller 40 and pressure roller 30 are moved to their respective second positions by the pneumatic cylinders 38*a*, 38*b*, 56 such that the drive roller 40 contacts the veneer strip 16 and feeds the veneer strip 16 between the pressure roller 30 and the slot nozzle 14. The pneumatic valve 22 of the slot nozzle 14 is actuated to dispense adhesive material from the liquid outlet 18 such that one side of the veneer strip 16 is coated with adhesive as the veneer strip 16 moves past the slot nozzle 14. The coated veneer strip 16 is then directed to contact the substrate 44, which is moving beneath the dispensing apparatus 10. The joined substrate 44 and veneer 16 continue to move along the profile wrapping machine 12 for subsequent processing.

When the end of the veneer strip 16 is reached, pneumatic valve 22 is actuated to shut off the flow of adhesive from the liquid outlet 18 and the pressure roller 30 and drive roller 40 are moved to their respective first positions. The apparatus 10 is then ready to receive a new strip 16 of veneer material to be coated with adhesive as described above. To facilitate moving the pressure roller 30 and drive roller 40 from the second positions to the first positions, biasing devices 62, such as springs or other resilient members, may be used to urge the pressure roller and/or drive roller toward the first positions. When such biasing devices 62 are used, the pneumatic cylinders 38*a*, 38*b*, 56 need only apply forces in one direction to move the pressure roller 30 or drive roller 40 from the first position to the second position.

The apparatus 10 may further include a sensor 64 positioned at a location near the slot nozzle 14 and adapted to sense the end of a substrate 44 being profile wrapped. The sensor 64 communicates with the control 60 and sends signals to the control 60 when the end of the substrate 44 is detected. In response to signals from the sensor 64 to indicate that the end of a substrate 44 has been detected, the control 60 may shut off the flow of adhesive from the slot nozzle 14 and move the drive roller 40 and pressure roller 30 to the first positions, as described above.

While the apparatus 10 has been described herein in connection with the application of adhesive to a strip of veneer, it will be appreciated that the apparatus 10 may also be used to apply adhesive to laminates provided in roll form. Operation of the apparatus 10 to coat laminate cover material from a roll is similar to that described above, but the apparatus 10 may be run continuously until the roll of laminate cover material is depleted.

While various aspects in accordance with the principles of the invention have been illustrated by the description of various embodiments, and while the embodiments have been described in considerable detail, they are not intended to restrict or in any way limit the scope of the invention to such detail. Additional advantages and modifications will readily appear to those skilled in the art. The various features disclosed herein may be used alone or in any desired combination. The invention in its broader aspects is therefore not limited to the specific details, representative apparatus and methods and illustrative examples shown and described. Accordingly, departures may be made from such details without departing from the scope of the general inventive concept.

What is claimed is:

1. An apparatus for applying adhesive to a veneer strip, comprising:

a slot nozzle having a liquid outlet for dispensing liquid material;

a pressure applying element adjacent said slot nozzle such that the veneer strip may be received between said slot nozzle and said pressure applying element, and such that said pressure applying element presses the veneer strip against said slot nozzle;

a drive roller powered for rotation and that feeds the veneer strip past said slot nozzle at a speed related to the speed of a substrate to which the veneer strip will be joined; and an idler roller cooperating with said drive roller to feed the veneer strip past said slot nozzle wherein said drive roller is movable from a first position sufficiently spaced from said idler roller such that said drive roller will not contact the veneer strip disposed between said drive roller and said idler roller, and a second position wherein said drive roller will engage the veneer strip disposed between said drive roller and said idler roller.

2. The apparatus of claim 1, wherein said pressure applying element is a pressure roller.

3. The apparatus of claim 2, wherein said pressure roller is powered for rotation to move the veneer strip over said slot nozzle and to direct the veneer strip to a substrate.

4. The apparatus of claim 1, wherein said pressure applying element is movable from a first position sufficiently spaced from said slot nozzle such that the veneer strip may be freely received between said slot nozzle and said pressure applying element, to a second position wherein said pressure applying element presses the veneer strip against said slot nozzle.

5. The apparatus of claim 1, wherein said slot nozzle is adjustable to vary a width of said liquid outlet.

6. The apparatus of claim 1, wherein said slot nozzle is adjustable to vary a position of said liquid outlet.

7. The apparatus of claim 1, further comprising a sensor that senses a terminal end of a substrate to which the veneer strip is applied.

8. The apparatus of claim 1, further comprising:

a sensor that sends a signal in response to sensing a terminal end of a substrate to which the veneer strip is applied; and a controller operatively coupled to the sensor, the controller moving the drive roller from the second position to the first position in response to the signal.

* * * * *